(12) United States Patent
Choi et al.

(10) Patent No.: US 6,398,839 B2
(45) Date of Patent: Jun. 4, 2002

(54) PLEATED FLUID FILTER MEDIUM FRAME

(75) Inventors: Kyung-Ju Choi, Jefferson County, KY (US); Dennis R. Porter, Dallas County; Ronald E. Braswell, Burleson, both of TX (US)

(73) Assignee: AAF International, Louisville, KY (US)

(*) Notice: Subject to any disclaimer, the term of this patent is extended or adjusted under 35 U.S.C. 154(b) by 0 days.

(21) Appl. No.: 09/840,938

(22) Filed: Apr. 24, 2001

Related U.S. Application Data

(62) Division of application No. 09/415,302, filed on Oct. 8, 1999, now Pat. No. 6,254,653.

(51) Int. Cl.⁷ .............................................. B01D 35/30
(52) U.S. Cl. ............................ 55/499; 55/500; 55/501
(58) Field of Search ........................ 55/497, 499, 500, 55/501

(56) References Cited

U.S. PATENT DOCUMENTS

| | | | |
|---|---|---|---|
| 1,830,096 A | * 11/1931 | Dollinger | 55/499 |
| 2,058,669 A | * 10/1936 | Dollinger | 55/499 |
| 3,392,846 A | 7/1968 | Getzin | 210/485 |
| 4,547,950 A | * 10/1985 | Thompson | 55/499 |
| 5,038,775 A | 8/1991 | Maruscak et al. | 128/205.27 |
| 5,531,235 A | * 7/1996 | Hassenboehler, Jr. | 131/332 |
| 5,597,645 A | 1/1997 | Pike et al. | 96/99 |
| 5,600,974 A | * 2/1997 | Schnegg et al. | 66/192 |
| 5,630,856 A | 5/1997 | Pfeffer | 55/488 |
| 5,643,653 A | 7/1997 | Griesbach, III et al. | 428/120 |
| 5,652,041 A | * 7/1997 | Buerger et al. | 428/198 |
| 5,709,735 A | 1/1998 | Midkiff et al. | 96/17 |
| 5,800,585 A | 9/1998 | Choi | 55/483 |
| 5,820,645 A | * 10/1998 | Murphy, Jr. | 55/385.3 |
| 5,855,784 A | 1/1999 | Pike et al. | 210/505 |
| 6,074,450 A | * 6/2000 | Raber | 55/497 |

OTHER PUBLICATIONS

Bending Resistance of Paper (Gurley Type Tester.), T5430m–94., 1994.

\* cited by examiner

*Primary Examiner*—Robert A. Hopkins
(74) *Attorney, Agent, or Firm*—Polster, Lieder, Woodruff & Lucchesi

(57) ABSTRACT

A self supporting pleated fluid filter medium having different fibers to provide pleats sufficiently self supporting to maintain pleated form during fluid filter treatment, the invention further including low melt fiber and an optional support frame and a method of making such pleated filter.

5 Claims, 3 Drawing Sheets

PLEATED FLUID FILTER MEDIUM FRAME

BACKGROUND OF THE INVENTION

This application is a divisional application of parent application Ser. No. 09/415,302, filed Oct. 8, 1999, by Kyung-Ju Choi and issued as U.S. Pat. No 6,254,653 B1 on Jul. 3, 2001.

The present invention relates to a flow-through fluid filter medium product and a method of forming and assembling the same and more particularly to a unique and novel air flow blended pleated filter medium which is sufficiently stiff to incorporate self-supporting pleats, a novel filter frame optionally usable therewith for treating high velocity fluid streams and a unique method for producing the inventive product.

Blends of fiber materials for use as fluid filter media have been generally known in the fluid filtration art. For example, it has been known to blend an inexpensive cotton, shoddy material with polyester fibers to form a filter medium. In pleating such blend filter medium, the soft characteristics of the material has required the use of stream interfering back-up materials which have been comparatively expensive in manufacture and assembly and which have added to fluid stream resistance. More recently, pleated blended filter media have been employed with comparatively high stiffness ratings in order to avoid the undesirable use of back-up materials. These more recently employed blended materials have been resin bonded and/or needle punched and often have been accompanied by an environmentally undesirable off-gas. Such undesirable off-gas arises mainly from the resin, which is generally used in bonding to obtain the comparatively high stiffness rating—usually with Gurley stiffness values in excess of four hundred (400) milligrams. Gurley units are assigned to represent the force required to bend material, such as paper, as calculated by an established equation. The details of Gurley units are explained in a 1994 TAPPI bulletin T543 om-94. This TAPPI method has been adopted and endorsed by the Tag and Label Manufacturers, Inc. (TLMI) and a copy of the TAPPI bulletin is submitted herewith along with copies of U.S. Pat. No. 5,643,653 issued to H. L. Griesbach, III et al on Jul. 1, 1997, which describes a shaped non-woven fabric bonded without compression by an adhesive polymeric component. A number of other patents have issued on arrangements for self-supporting filters, attention being directed to U.S. Pat. No. 5,038,775, issued to J. Maruscak et al on Aug. 13, 1991; U.S. Pat. No. 5,630,856, issued to J. R. Pfeiffer on May 20, 1997 and No. 5,800,585 issued to Kyung-Ju Choi on Sep. 1, 1998, each of which teaches the utilization of a back-up scrim or netting for filter medium stiffness. Attention also is directed to U.S. Pat. No. 5,597,645, issued to R. D. Pike et al on Jan. 28, 1997, U.S. Pat. No. 5,709,735, issued to D. G. Midkiff on Jan. 20, 1998; and, U.S. Pat. No. 5,855,784, issued to R. D. Pike et al on Jan. 5, 1999, each of which teaches the use of blended fibers to obtain a filter medium of high stiffness. Further, attention is directed to U.S. patent applications Ser. No. 09/176,665, filed Oct. 21, 1998, now U.S. Pat. No. 6,159,318, issued Dec. 12, 2000, and Ser. No. 09/277,795, filed March 27, 1999, now U.S. Pat. No. 6,165,242, issued Dec. 26, 2000, inventor Kyung-Ju Choi, both disclosing certain of the 9 method steps incorporated with the novel method steps herein. Finally, attention is directed to above Bulletin T543 om-94 on "Bending Resistance of Paper (Gurley-type tester)", endorsed by the Tag and Label Manufacturers Institute, Inc. (TLMI).

In accordance with the present invention, a straightforward and economical pleated filter medium product and method of making the same is provided which can be readily and inexpensively manufactured and assembled in a unique and novel manner to produce with a minimum of parts and a minimum of steps the inventive pleated filter medium product disclosed herein without the use of undesirable off-gas resins and generally without the past need of costly, resistance forming back-up materials for filtering fluid streams at conventional fluid velocities. The present invention further provides a novel filter frame which optionally can be employed with the unique self-supporting pleated product to enhance pleated filter medium support in the treatment of high velocity fluid streams without wear and tear at the pleated filter medium crests. In addition, the present invention not only recognizes and avoids the use of undesirable off-gas emitting resins in producing the novel product described herein, but provides a unique scoring and controlled heating step at preselected heating temperatures to enhance pleating without the usual synthetic filter material elastic recovery or spring-back of past pleating operations and without the use of past organic solvents and their concomitant undesirable features occasioned by curing with environmentally undesirable off-gas emissions.

Various other features of the present invention will become obvious to one skilled in the art upon reading the disclosure herein.

BRIEF SUMMARY OF THE PRESENT INVENTION

More particularly the present invention provides a self-supporting pleated fluid filter medium comprising: a blend by weight of preselected different fibers at least one of which is of preselected low melt fiber material with a portion of the low melt fiber material melted into the blend, the blend having at least a sufficient stiffness to provide for self-supporting pleats sufficient to maintain pleat form during an anticipated fluid filtering treatment velocity.

Further, the present invention provides a unique method of forming fibrous filter medium comprising: selecting and disposing in a supply zone a roll of fibrous filter medium composed of a blend of preselected fibers including a preselected portion of low melt fibers with such low melt fibers being capable of melting at a preselected temperature to provide a filter medium blend of sufficient stiffness to provide for self-supporting pleats capable of maintaining pleated form during an anticipated fluid filtering treatment velocity; feeding the blended filter medium at a preselected velocity from the roll in the supply zone through a scoring zone to apply rows of spaced pleat crest score lines thereon; feeding the scored filter medium at a preselected lower velocity to a pleating zone, the lower velocity being sufficiently different to allow the filter medium to fold into pleats along the score lines; and, heat treating the pleated filter medium at the preselected temperature.

In addition, the present invention provides a novel filter frame member comprising: a flat body member having an inner perimeter defining a flow-through passage to receive a passage covering pleated filter medium in sealed relation therewith, the body member including pleat support members extending therefrom to engage in supporting relation along only the side faces of the pleated filter medium in spaced relation from the crests of the pleated filter medium.

It is to be understood that various changes can be made by one skilled in the art in one or more of the several parts and the several steps of the invention disclosed herein without departing from the scope or spirit of the present invention

BRIEF DESCRIPTION OF THE DRAWINGS

Referring to the drawings which discloses several embodiments of the present invention.

DETAILED DESCRIPTION OF THE PRESENT INVENTION

Although blended fiber filter media have been generally known in the filtration art —as has the utilization of melt type fiber materials in such blends, the present invention recognizes that this combined arrangement can be utilized in preselected blend percentages to provide a unique, self-supported pleated filter medium heretofore unknown in the fluid filtering art. In addition, the present invention provides a novel series of method steps to arrive at such novel, blended pleated filter media and a novel frame arrangement for supporting side wall pleat flanks when the destined use of the self-supporting pleated filter medium is with the treatment of high velocity fluid streams.

In accordance with the present invention, three blended samples of unique filter medium were tested to provide the novel self-supporting pleated filter medium along with a conventional pleated filter medium. The three blended samples of the unique self-supporting pleated filter medium and the conventional filter medium were comprised of the following blends:

Sample 1: thirty percent (30%) of six (6) denier fibers, thirty percent (30%) of one (1) denier fibers and forty percent (40%) of four (4) denier low melt fibers.

Sample 2: thirty to thirty-five percent (30–35%) of six (6) denier fibers, five to 10 percent (5–10%) of one (1) denier fibers and sixty percent (60%) of four (4) denier low melt fibers.

Sample 3: forty percent (40%) of six (6) denier fibers and sixty percent (60%) of four (4) denier low melt fibers.

Conventional: cotton shoddy blended with polyester fibers.

Comparative test data on the three unique filter medium samples above and the conventional filter medium served to provide the following information:

| | Stiffness (mg) | | Av. Efficiency 3–10 | Resistance Initial | Dust Holding Capacity (g) | Basis Weight G/sq m | Thickness mm |
|---|---|---|---|---|---|---|---|
| | TD | MD | Microns | ($H_2O^n$) | | | |
| Sample 1 | 1100 | 900 | 60.2 | 0.400 | 85 | 110 | 2.5 |
| Sample 2 | 800 | 500 | 50.8 | 0.322 | 172 | 116 | 3.8 |
| Sample 3 | 900 | 750 | 42.8 | 0.264 | 152 | 122 | 2.8 |
| Conventional | 75 | 70 | 32.0 | 0.333 | 158 | 88 | 3.3 |

Figure 1:
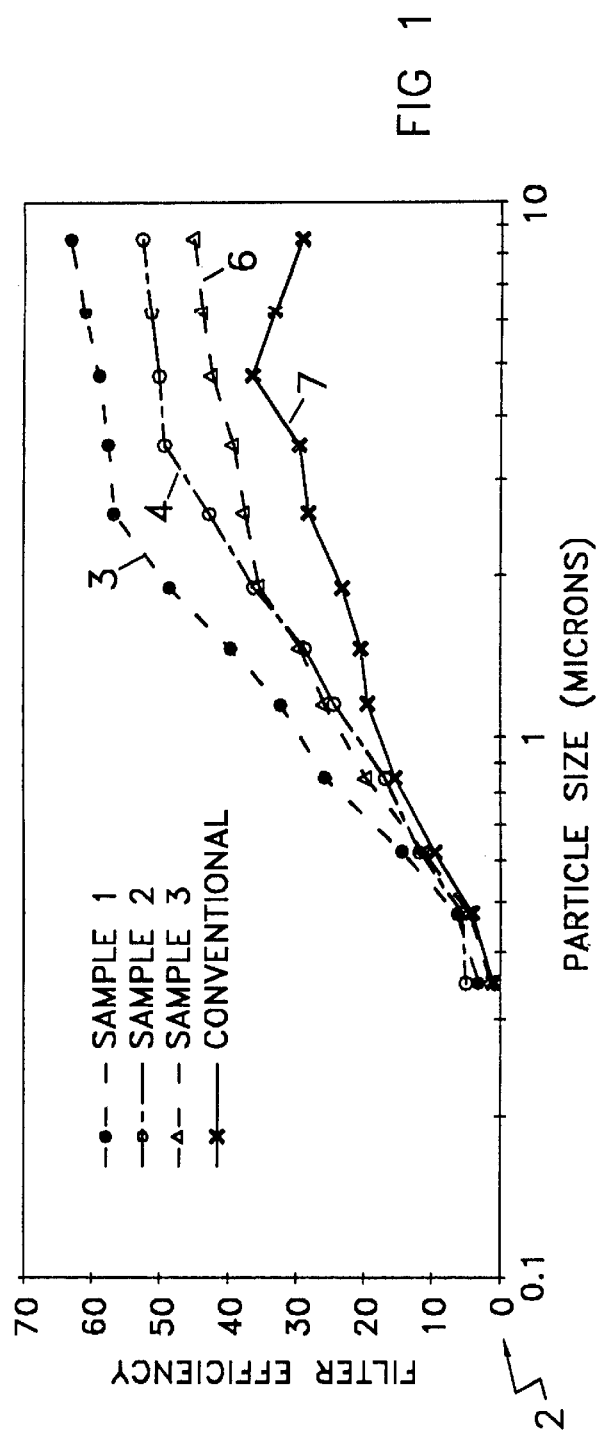
FIG. 1 sets forth a comparative graph plotting filter efficiency (percentage) against relative particle size (microns) or three inventive sample filter medium blends and a conventional filter medium.

As can be seen from the above comparative data, the inventive blend samples proved to provide substantially more Gurley stiffness both along the transverse axis of filter medium emission from a production mill machine (MD) and along the lineal axis of emission from such production mill machine (MD). For example, the inventive blended filter medium Sample 2 comprising thirty (30) to thirty-five (35) percent (%) of six (6) denier fibers, five to ten (5–10) percent (%) of one (1) denier fiber and sixty (60) percent (%) of four (4) denier low melt fibers revealed a Gurley stiffness of eight hundred (800) along the transverse axis of the Sample 2 (800 TD) and Gurley stiffness of five hundred (500) along the lineal axis (500 MD). The conventional filter medium of cotton shoddy blended with polyester fibers, on the other hand, revealed a Gurley stiffness of seventy-five along the traverse axis (75 TD) and a Gurley stiffness along the lineal axis of seventy (70 MD)—comparatively outside the self-supported pleated filter medium range. Moreover, Sample 2 showed a significantly improved average efficiency and dust holding capacity over the aforedescribed conventional filter medium. A further comparative study of the three blended Samples reveals the decided improvement obtained by the blended Samples over conventional medium. In this regard, reference is made to the particle size filter efficiency graph 2 of FIG. 1 and the following table compatible with this graph for the above described inventive filter medium Samples 1, 2 and 3 and the conventional filter medium sample,. indicated respectively by the filled circle and dashed line reference numeral 3 for Sample 1, by the unfilled circle and dashed line reference numeral 4 for Sample 2, by the unfilled triangle and dashed line reference numeral 6 for Sample 3 and the "x" ed and full line reference numeral 7 for the conventional filter medium.

| COMPARATIVE PERCENT EFFICIENCIES | | | | |
|---|---|---|---|---|
| Particle | Samples | | | |
| Size (Micron) | 1 | 2 | 3 | Conventional |
| 0.35 | 3.1 | 1.2 | 4.9 | 1.2 |
| 0.475 | 6.1 | 4.4 | 5.6 | 4 |
| 0.625 | 14.2 | 11.6 | 11.2 | 9.5 |
| 0.85 | 25.4 | 16.7 | 19.7 | 15.5 |
| 1.15 | 32.1 | 24.2 | 25.8 | 19.3 |
| 1.45 | 39.4 | 28.6 | 29.4 | 20.3 |
| 1.9 | 48.5 | 36.1 | 35.5 | 23 |
| 2.6 | 56.6 | 42.7 | 37.6 | 28 |
| 3.5 | 57.5 | 49.3 | 39.4 | 29.3 |
| 4.75 | 58.9 | 50.1 | 42.5 | 36.3 |

-continued

COMPARATIVE PERCENT EFFICIENCIES

| Particle | Samples | | | |
|---|---|---|---|---|
| Size (Micron) | 1 | 2 | 3 | Conventional |
| 6.25 | 61 | 51.3 | 43.9 | 33.2 |
| 8.5> | 63.2 | 52.6 | 45.2 | 29.1 |

From the above data it can readily be seen that the novel Samples 1, 2 and 3, which provide a blend of different fibers, at least one of which is of preselected low melt fiber material, can be of sufficient stiffness to provide for self-supporting filter medium pleats sufficient to maintain pleated form during an anticipated fluid filtering treatment velocity, the inventive Samples 1, 2 and 3 being comparatively more efficient in filtration of different micron size particles than a conventional filter medium with the micron size particles varying from zero point three five (0.35) to as large as eight point five (8.5) microns. Advantageously, the blend by weight can be comprised of at least two different fibers in the approximate range of zero point five (0.5) deniers up to forty (40) deniers. And, as above noted in the charts, the blend by weight of preselected fibers can be comprised of approximately five (5) to fifty (50) percent (%) six (6) denier fibers, zero (0) to forty (40) percent (%) one (1) denier fiber and thirty (30) to ninety-five (95) percent (%) preselected low melt fibers. In still a further embodiment of the present invention the blend by weight of preselected fibers can be comprised of approximately five (5) to fifty (50) percent (%) six (6) denier fibers, zero (0) to forty (40) percent (%) one (1) denier fiber, and thirty (30) to ninety-five (95) percent (%) four (4) denier low melt fibers. It is to be understood that at least one of the different blend fibers can be synthetic fibers, such as a polyester fibers, and that the filter medium blend has a Gurley stiffness of at least approximately four hundred (400) milligrams in accordance with the standards as set forth in above noted bulletin T543 om-94 on "Bending resistance of paper (Gurley-type tester)". In one advantageous embodiment of the present invention, the inventive filter medium blend has a Gurley stiffness along any direction of the novel filter medium in the approximate Gurley stiffness range of four hundred (400) to sixteen hundred (1600) milligrams. And, in still another advantageous embodiment of the invention, a Gurley stiffness for an inventive filter medium has advantageously been along the lineal axis of emission of the novel filter medium blend from a production mill machine (MD) of approximately five hundred (500) milligrams and along the transverse axis of emission of the novel filter medium blend from a production mill machine (TD) of approximately eight hundred (800) milligrams. (See the above chart for Sample 2.) Further, in accordance with still another feature of the present invention, it has been found to be advantageous to have the downstream side of a novel self-supporting, pleated filter medium blend with at least a slightly greater concentration of smaller denier fibers.

Generally, the novel self-supporting pleated filter medium suitable particularly for air filtration is comprised of a blend by weight of preselected fibers comprising approximately five (5) to fifty (50) percent (%) six (6) denier fibers, zero (0) to forty (40) percent (%) one (1) denier fibers, and thirty (30) to ninety-five (95) percent (%) preselected low melt fibers having the downstream side of the filter medium blend with a slightly greater concentration of smaller size fibers, wherein the filter medium blend has a Gurley stiffness along any direction of the medium lineal or transverse—in the approximate Gurley stiffness range of four hundred (400) to sixteen hundred (1600) milligrams.

Figure 2:
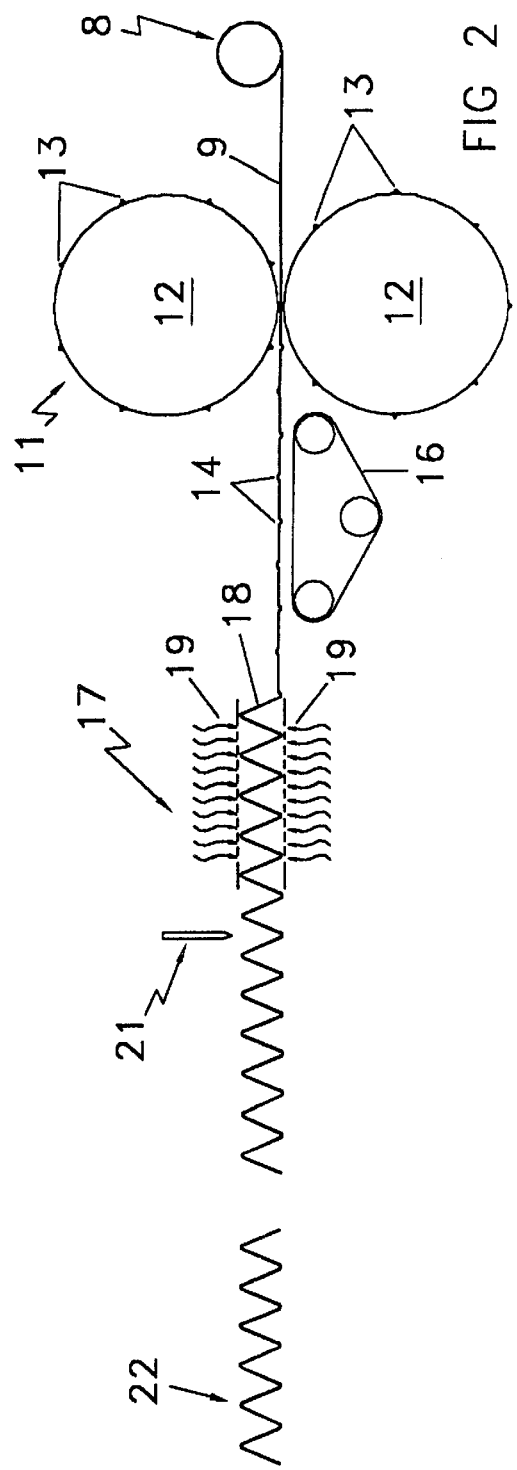
FIG. 2 is a schematic, vertical view of apparatus which can be employed to carry out the inventive method steps of the present invention.

Referring to FIG. 2 of the drawings, the novel method of forming any one of the above-described inventive filter medium blends is disclosed. This method includes the step of selecting and distributing from a supply roll zone 8 an inventive blend of preselected fibers. For example, the selected blend can have the aforedescribed Gurley stiffness of four hundred (400) to sixteen hundred (1600) milligrams and approximately five (5) to fifty (50) percent (%) six (6) denier fibers; zero (0) to forty (40) percent (%) one (1) denier fiber and thirty (30) to ninety-five (95) percent (%) preselected low melt fibers with the downstream side of the blended filter medium having a slightly greater concentration of smaller size fibers. The selected blend of filter medium can be fed as a continuous filter medium sheet 9 from supply roll zone 8 at a preselected velocity to a roll scoring zone 11 where opposed and aligned scoring rolls 12 with spaced scoring barbs 13 apply rows of transversely spaced pleat crest score lines 14 thereon. Filter medium sheet 9 can then be fed at a preselected lower velocity by conveyor 16 to a pleating and heating zone 17, the lower feed velocity being sufficiently different to allow the scored filter medium 9 to fold into pleats 18 along the spaced score lines 14. The pleats 18 are then heat treated through a suitable heating device 19 positioned on opposite sides of the pleats 18 of pleated filter medium 9. Depending upon the nature of the filter medium blend and the low melt fibers the heating temperatures can be in the range of approximately one-hundred-fifty (150) to three-hundred-fifty (350) degrees Fahrenheit (F°) and with the aforedescribed embodiment for the above described filter medium blend fed as sheet 9 from supply roll zone 8, the heating temperature can be approximately two hundred (200) degrees Fahrenheit (F°) to soften the low melt fibers therein. It is to be understood that any one of several known heating devices can be utilized for heating, including surrounding gas or electric heating plates and/or the forced heated air and opposed perforated distribution plates, such as shown schematically by reference numeral 19. From the pleating and heating zone 17, the pleated filter medium blend can then be passed to a pleat shearing zone 21 to sever the pleated filter medium into self-supporting pleated filter medium units 22, each unit having a preselected number of pleats in accordance with its destined use.

Figure 4:
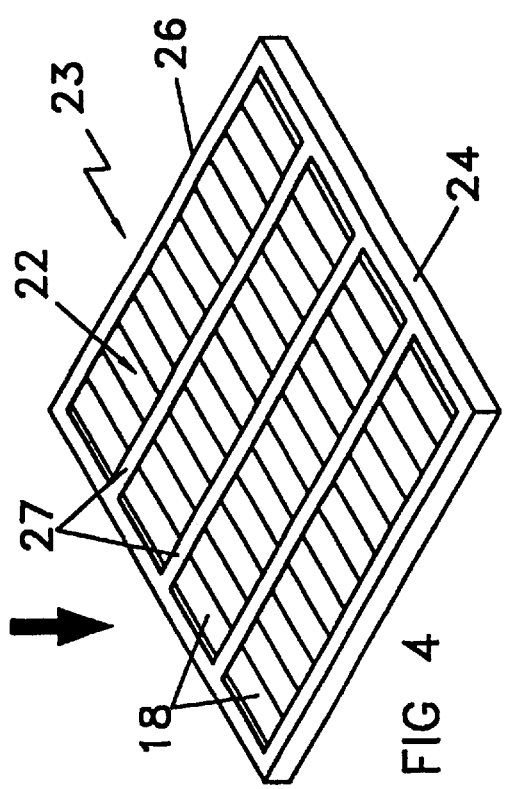
FIG. 4 is a somewhat reduced isometric view of the upstream side of another form of novel filter frame which can be utilized with self-supporting blended fiber pleated filter medium of the present invention.
Figure 5:
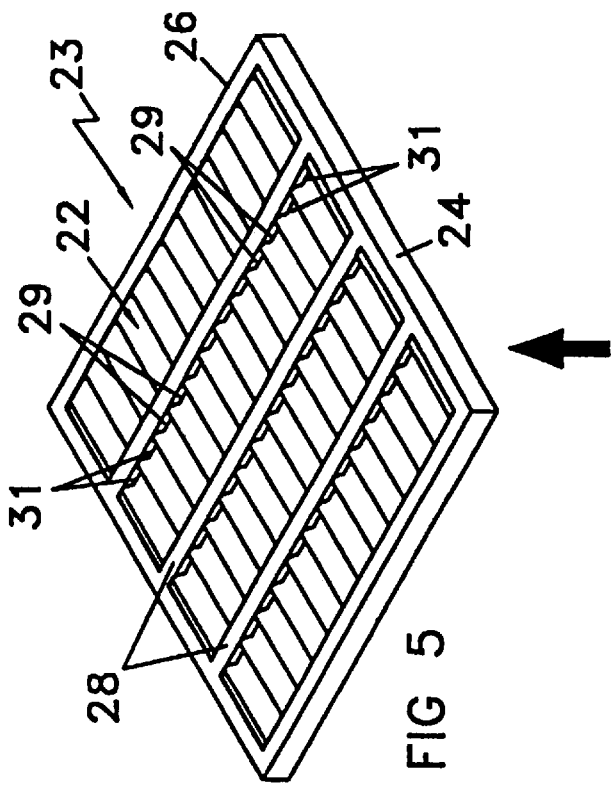
FIG. 5 is a similar isometric view of the downstream side of the frame of FIG. 3, disclosing the novel truncated sidewall, pleat support arrangement which can be employed when treating high velocity fluid streams.
Figure 3:
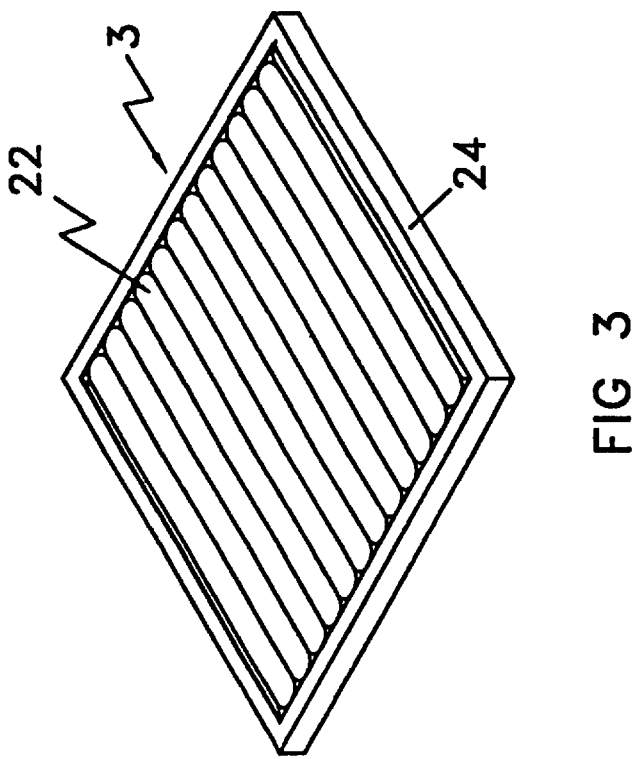
FIG. 3 is an isometric view of one form of filter frame which can be utilized with self-supporting blended fiber pleated filter medium of the present invention.

Referring to FIGS. 3, 4, and 5 of the drawings, a pleated filter medium unit 22 is shown assembled in a novel frame member 23 which can be made from any one of several comparatively firm materials, such as cardboard, plastic, wood or thin metal. Frame member 23 includes a body member 24, here shown as rectangular in shape. Body member 24 has an inner perimeter 26 which defines a flow-through passage with an inventive self-supporting pleated filter medium unit 22 covering the flow-through passage and the periphery of the unit 22 being in sealed relation with body member. In FIG. 3, the upstream and downstream face of the body member 24 do not include additional support strips. Optionally, on the upstream side of body member 24 (FIG. 4), spaced flat strips 27 can be provided along the upstream side of frame member 24 to extend transverse the pleats 18 and be joined to opposed sides of body member 24. Referring to FIG. 5 which discloses, the downstream side of frame 23, inventive space pleat support strips 28 are disclosed. These spaced strips 28, like spaced upstream strips 27 in FIG. 4, can extend transverse the crests of pleats 18 with opposed ends there of joined to opposed sides of frame member. In accordance with one novel feature of the present invention and particularly useful when it is known that self-supported pleated filter units 22 are to be utilized to treat high velocity fluid steams spaced support strips 28.

In some instances, flat strips like strips 27 will suffice and if desired can be contoured to augment the self-supported filter medium unit 22. In this regard, spaced support strips 28 can include tabs 29 integral with and extending at preselected angles from the side edges of support strips to nest with side flanks of pleats 8 in a manner similar to tabs 32 disclosed in above mentioned copending patent application, Ser. No. 09/176,665, filed Oct. 21, 1998 by Kyung-Ju Choi, now U.S. Pat. No. 6,159,318 issued Dec. 12, 2000. However, in accordance with the present invention, tabs 29 are preselectively truncated at the tips 31 thereof and are shaped to conform with the side flanks of the pleats along one face thereof so as to be spaced from the pleat crests. Thus, pressure and concomitant undesirable wear of filter medium material is avoided at the scored pleat crests but, at the same time, augmented support to the self-supporting pleated filter medium is provided when high velocity fluid streams are to be treated.

Figure 6:
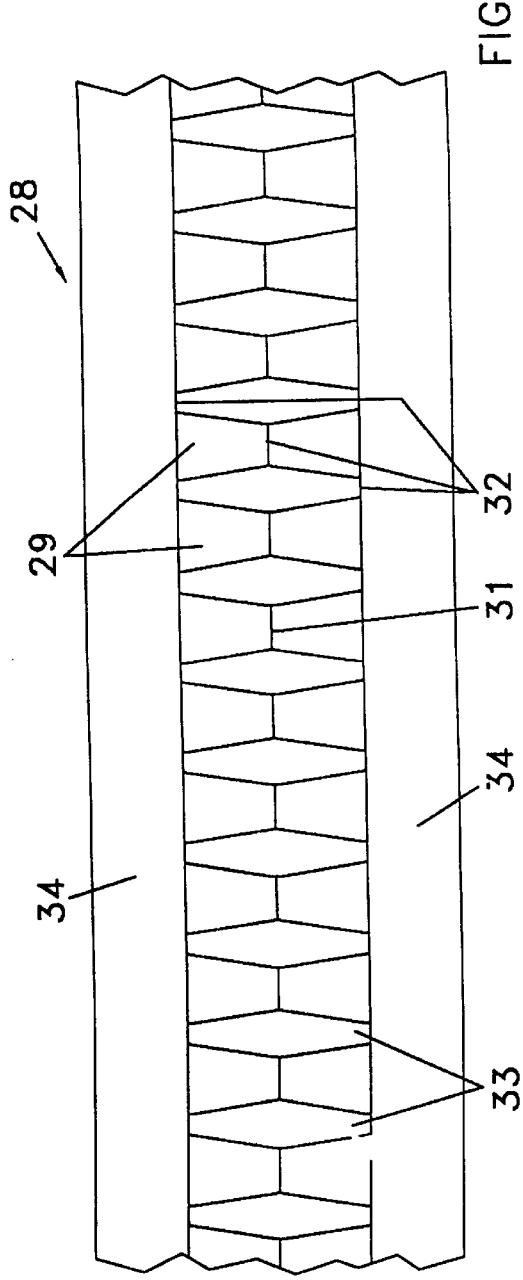
FIG. 6 is a portion of a flat blank which can be folded to allow movement thereabout and provide the novel erected pleat support arrangement of FIG. 5; and, FIG. 7 is an isometric view of a portion of a border frame body member with the novel pleat support arrangement of FIG. 6 properly folded and erected and an end tab fastened to a side flank of the border frame body member.
Figure 7:
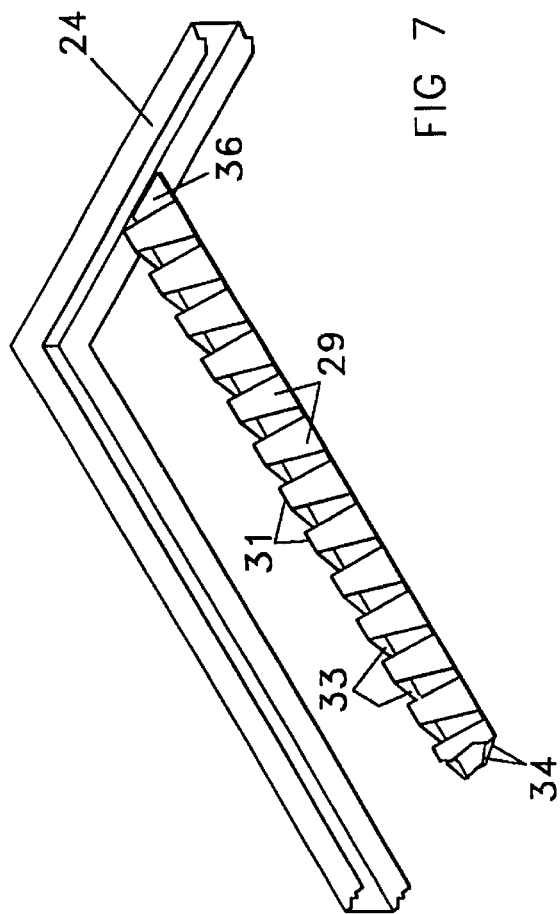

In this regard, attention is directed to FIGS. 6 and 7 of the drawings wherein a portion of support strip 28 is disclosed in blank form in FIG. 6 with fold lines indicated by lines 32. Diamond shaped cut-outs 33 can be seen as disposed between opposed spaced longitudinally extending foldable flanks 34. To erect support strip 28, the blank of the support strip can be folded along fold lines 32 with foldable flanks 34 in overlapped position to strengthen the support strip 28 and allowing movement about the fold lines 32 to provide an erected pleat support arrangement. Suitable tabs 36 are provided at opposed extremities of the blank forming, each strip 28, only one of which tabs 36 being disclosed in FIG. 7 as fastened to a side flank of body member 24. It is to be understood that a corresponding opposed tab 36 at the opposed extremity of the blank is fastened to a correspondingly spaced opposed side of body member 24. It also is to be understood that although truncated tips 31 are disclosed in FIGS. 6 and 7, other tip shapes can be employed.

The invention claimed is:

1. A filter frame member comprising: a border body member having an inner perimeter defining a flow-through passage to receive a passage covering pleated filter medium in the form of spaced pleats having spaced opposed crest sets and side flanks along opposed pleated sides between said opposed crest sets, said filter medium being in sealed relation with said border member, said border body member including at least one foldable and erectable pleat support member fastened at its extremities to said border body member and extending therefrom in the form of at least one strip to transversely engage one of said opposed crest sets and be in supporting, conforming relation along and with said flanks of said pleated filter medium in spaced relation from the crests of said other crest set of said pleated filter medium.

2. A filter frame member comprising: a substantially rectangular border body member having an inner perimeter defining a substantially rectangular flow through passage to receive a passage covering filter medium in the form of spaced pleats having opposed faces with side flanks along opposed pleated sides with said body member in sealed relation with said passage covering filter medium, said body member including at least one spaced strip attached at its extremities to said border body member and having foldable and erectable pleat support members extending from said inner perimeter thereof transverse said spaced pleats, said strip when erected from said body member having side flanks with tips shaped to conform with the side flanks of adjacent spaced pleats along one face of said pleated filter medium to be spaced from the crests thereof.

3. The filter frame of claim 2, further including at least two spaced strips extending from said inner perimeter of said body member transversely to said pleats to abut and support the opposite faces of spaced adjacent pleats of said pleated filter medium.

4. The filter frame member of claim 2, said spaced strip being formed from a longitudinally extending blank member including spaced opposed longitudinally extending outer borders with foldable portions having tip forming spaced cut-out portions therebetween and tab portions at opposed extremities to be fastened to said body member when said strip is folded to erect position with said borders adjacent said foldable portions reinforcingly overlapping.

5. The filter frame member of claim 4, said tip forming spaced cut-out portions being so shaped as to provide truncated tips when erected.

\* \* \* \* \*